United States Patent [19]

Lebduska

[11] 4,090,793
[45] May 23, 1978

[54] PHOTOMETRIC METHOD AND APPARATUS FOR MEASURING PACKING FRACTION OF TERMINATED FIBER OPTIC CABLES

[75] Inventor: Robert L. Lebduska, La Mesa, Calif.

[73] Assignee: The United States of America as represented by the Secretary of the Navy, Washington, D.C.

[21] Appl. No.: 736,902

[22] Filed: Oct. 29, 1976

[51] Int. Cl.² ............................................. G01N 21/22
[52] U.S. Cl. .................................................... 356/205
[58] Field of Search ............... 356/206, 205, 208, 201, 356/204

[56] References Cited

U.S. PATENT DOCUMENTS 3,625,621 12/1971 Fields .................................... 356/206
3,770,354 11/1973 Tsuruta et al. ........................ 356/206

FOREIGN PATENT DOCUMENTS 1,029,594 5/1958 Germany .............................. 356/206

OTHER PUBLICATIONS

Kapany, N. S. *Fiber Optics,* New York, Academic Press, 1967, p. 169.

Primary Examiner—John K. Corbin
Assistant Examiner—R. A. Rosenberger
Attorney, Agent, or Firm—R. S. Sciascia; G. J. Rubens

[57] ABSTRACT

The transmission efficiency of radiant energy through terminated fiber optic cables depends substantially on the packing fraction of the specific fiber optic cable being employed. The invention method and apparatus enables any given length of sample fiber cable to be tested, at the installation site if necessary, to obtain a direct reading in terms of packing fraction. The method compares the light level of the energy transmission through a calibrated, solid core calibration rod of known diameter with the energy transmission through the sample terminated cable.

9 Claims, 4 Drawing Figures

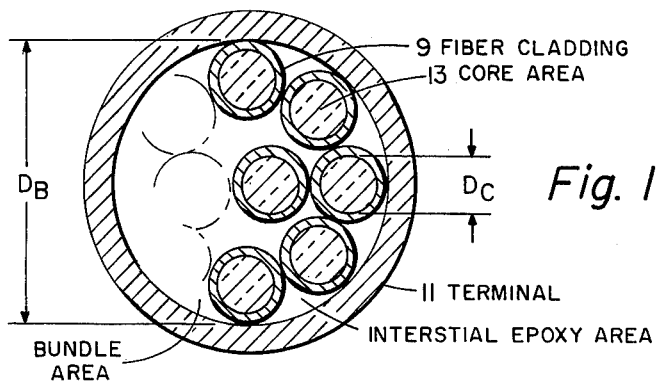
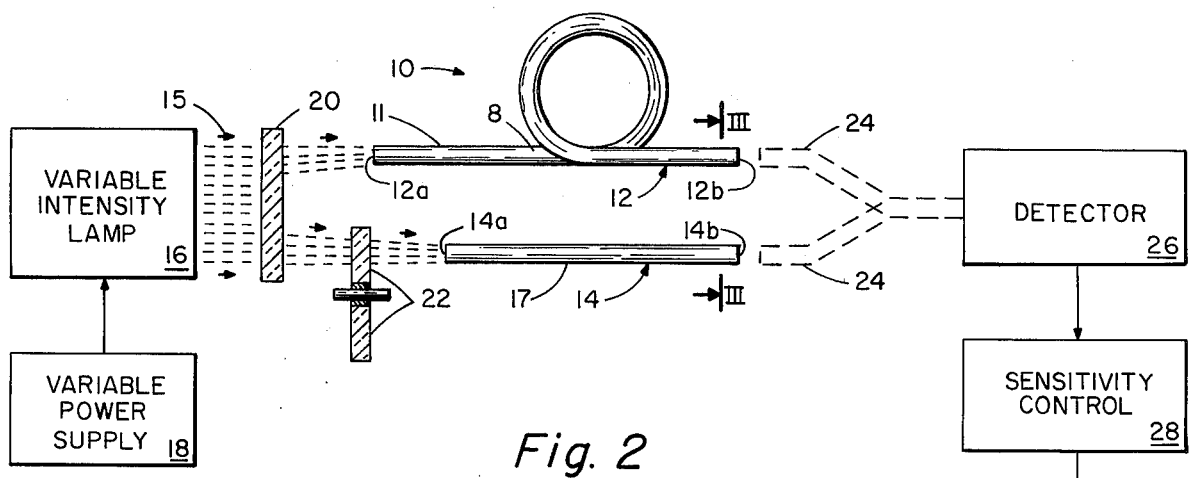
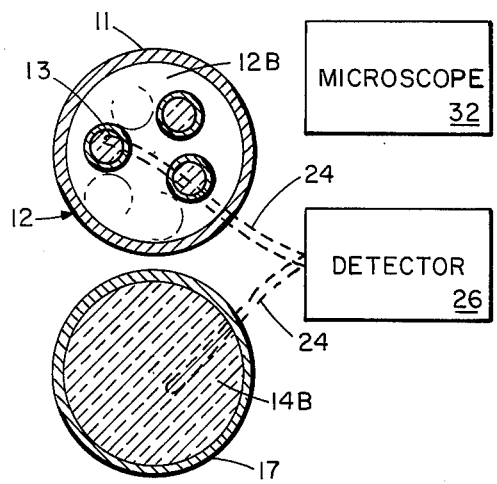
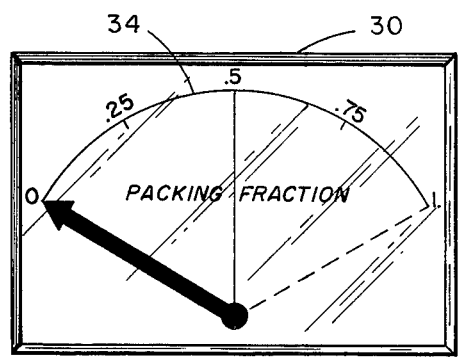

PHOTOMETRIC METHOD AND APPARATUS FOR MEASURING PACKING FRACTION OF TERMINATED FIBER OPTIC CABLES

CROSS REFERENCE TO RELATED APPLICATION

This invention relates to U.S. Pat. No. 3,884,585 issued to me on May 20, 1975, entitled "Fiber Break Detection Methods" for cables using multi fiber optical bundles.

BACKGROUND OF THE INVENTION

This invention relates to the testing of fiber optic cables, and more particularly to a method and apparatus for determining the packing fraction of such cable terminations.

As indicated in my prior U.S. Pat. No. 3,884,585 there is a requirement to determine the degradation of transmission of radiant energy through fiber optic cables. One reason for such losses is the breakage of the individual fibers that may occur during manufacture or installation and use. The above patented method is directed to assessing the amount of such breakage.

However, degradation of radiant energy transmission can also arise from other factors that are inherent in the manufacture of the terminated fiber optical cable, namely, the kind and thickness of the fiber cladding, and the amount of intersticial area between the fibers usually occupied by an epoxy or like material as determined by the quality of fiber packing during termination. The area of these non-energy transmitting areas obviously effects the total efficiency of the fiber optic cable in transmitting the energy.

The energy transmitting efficiency of the terminated fiber optic cable can be expressed in a term called packing fraction (P. F.), being defined as the ratio of the total sum of the cross-sectional areas of the various individual fiber filaments in the bundle, to the total area of the bundle. Thus, any transmission losses due to filament breakage would be included in the packing fraction.

To date, there are no known methods in the prior art for determining the packing fraction of a terminated fiber optic cable. The need for such a method arises when such an operational requirement is specified in U.S. Navy specification for the manufacture of such terminated cables for use in Navy systems.

SUMMARY OF THE INVENTION

The novel method measures the packing fraction of a terminated length of a fiber optic cable by utilizing photometric means for comparing the total light transmitted through the sample cable bundle with the energy transmitted through a calibrated, cladded glass rod of known core diameter, approximately the same diameter as the fiber optic bundle. The calibrated rod preferrably should have a solid core construction as it will inherently have a P.F. factor of one. Where the terminated cables to be tested extend over a wide range of diameters more than one diameter calibration rod may be made available for testing all the cables.

As it is necessary to measure the P. F. in terminated cables of varying length and with different transmission losses, the desired area comparison can be made by setting an equal energy intensity to be transmitted through the fiber filament cores, with the energy transmitted through the calibration rod. This intensity setting is accomplished by passing an equal amount of light from a variable light source through both the sample cable and the calibration rod, and detecting the amount of light appearing at a stable photo-detector. The light transmission through the probe area of calibration rod is then attenuated so that the light transmission through both the probe area of the sample cable and the same probe area of the calibration rod are equal. Thereafter, the total light transmission through the calibration rod is further attenuated by the ratio of the total cross-sectional area of the sample cable bundle to the total cross-sectional area of the calibration rod.

Now the total light transmitted through the calibration rod compares with the total light which would be transmitted by a bundle area which is 100% transmitting i.e. a solid core. In effect, this optically equals the rod area with the known bundle area. Then by means of a photo-detector the total light energy passing through the sample cable is compared with the light energy passing through the calibration rod (having a value of 100% or a P. F. of one) to determine the packing fraction of the sample cable terminal. The same process is repeated on the other terminated end of the cable.

STATEMENT OF THE OBJECTS

A principal object of this invention is to provide a novel method and apparatus for measuring the packing fraction of the terminations of a sample fiber optic cable.

Additional objects are to provide such a method and apparatus that is portable for setting up at an installation site of the cable to be tested; which is simple and easy to operate; and in which measurement of packing fraction is read directly on the meter.

BRIEF DESCRIPTION OF THE DRAWINGS

FIG. 1 is an end face view of a typical multi-fiber optical bundle terminal describing its components.

FIG. 2 is a diagrammatic view of the apparatus set up to measure the packing fraction of a test sample of a terminated fiber optic cable.

FIG. 3 is an enlarged end face views of both the fiber optic cable and calibration rod taken along the III—III of FIG. 2 showing the two positions of the probe.

FIG. 4 is an enlarged elevation view of the packing fraction meter.

BRIEF DESCRIPTION OF THE PREFERRED EMBODIMENT

Referring to the drawings where like reference numerals refer to similar parts throughout the figures there are shown in FIG. 2 the apparatus 10 of the present invention set up to measure the packing fraction of a terminated length of fiber optic cable 12 to be tested. The apparatus can be made portable to the installation site of cable 12.

With reference to FIG. 1, the packing fraction (P. F.) of a terminated cable can be defined as the ratio of the total optical transmitting cross-sectional area, being a summation of all the fiber core areas of the bundle, to the total area of the cable termination within which the fibers are contained: or P. F. = Σ areas (transmitting cores)/area (bundle).

It should be noted that in FIG. 1, the normal outer protective jacket 8 (not shown) of fiber optic cable 12 has been stripped from the two ends of the cable, and the loose ends of the various fibers 13 and their cladding 9 have been epoxied in a suitable terminal 11 at each end of the cable in a manner well known in the art. It is at both of these terminals, whether it be an input or an output terminal, where the packing fraction is to be measured to determine the optical coupling efficiency where the cable is interfaced with other equipment. Hereafter in this discussion, any reference to cable 12 is intended to refer to the terminated bundle, which is the energy transmitting portion of the assembled cable.

The components of the typical fiber optic cable 12 are defined in FIG. 1. It is obvious that the packing fraction of the terminated ends of the cable must of necessity be less than one because the fiber cladding around each fiber and the epoxy intersticial area between the fibers will transmit little, if any, energy.

The need for measuring the packing fraction of a terminated cable may arise in several ways. For example, it may be necessary to check a supply of terminated fiber optic cables furnished by a cable manufacturer to a user organization to ascertain if they meet design specifications. Further, it may be desirable to check a given length of terminated fiber optic cable after installation, and, or after use over a given period of time, to determine integrity and possible loss of light transmission caused by fiber breakage, or any other condition affecting the cross-sectional transmitting area of the cable.

Referring again to FIG. 2, apparatus 10 includes a short piece of a solid glass calibration rod 14, which may be of any length i.e. from 4 to 6 inches in length, suitable for housing in an enclosure (not shown). As a practical matter, for reasons later to be described, the cross-sectional area of calibration rod should be approximately the same as the cable bundle area that is to be tested. Calibration rod 14 is provided with a protective cladding 17 similar to fiber cladding 9. Because calibration rod 14 is relatively short in length, the ends of cladding 17 may be painted with black absorbing paint to prevent light transmission through the cladding which is no problem in long lengths of fiber cables. Hereafter in this discussion, any reference to the calibration rod is intended to refer to only the light transmitting portion of the rod i.e. its core.

Cable 12 and calibration rod 14 are closely positioned with their terminated input ends 12a and 14a, respectively, in substantial parallel relation to receive illumination, indicated by arrows 15, from a variable intensity lamp 16. Lamp 16 is controlled by a variable power supply 18, which may be a D. C. supply if portability is a factor. A diffusing plate 20 is inserted between lamp 16 and the input ends 12a and 14a to ensure a uniform, wide angle source of light across the faces thereof.

Between diffusing plate 20 and only the input end 14a of the calibration rod is positioned a set of continuously variable, neutral-density optical filters 22, which may be convenient by mounted on a rotatable wheel to provide a suitable selection of different calibrated density filters. The purpose of filters 22 is to variably attenuate the light being transmitted through calibration rod 14 so as to correspond to the light intensity being transmitted through test cable 12.

Variable power supply 18 enables an adequate amount of light to be available for detection, depending on the length of terminated sample cable 12.

The first step in the process is to ensure that the same amount of light is being transmitted through both test cable 12 and calibration rod 14.

A fiber optic probe 24 is movably connected to a stable PIN type silicon detector 26 which in turn is connected to a sensitivity control 28 for a PF indicator meter 30. Detector 26 is commercially available, preferably having 5 decades of linear reading providing a $10^5$ readings.

The diameter of probe 24 is smaller than the smallest diameter fiber to be measured. A microscope 32 is employed to enable the probe end to be placed against and centered within selected ends of the individual fibers of cable 12 to obtain a mean transmitted light intensity level among the several fibers. The same probe 24 is movable for positioning against the face of calibration rod 14. After the probe has been moved away, detector 26 can be positioned against the terminated output ends 12b and 14b of the test cable and the calibration rod, respectively.

An enlarged view of P. F. meter 30 is shown in FIG. 4. Scale 34 indicates packing fraction in decimal reading from zero to one.

OPERATION

The packing fraction measurement of output terminal 12b of cable 12 is carried out in the following manner and which is independent of the cable length. An adequate level of light through test cable 12 is made available to detector 26 by adjusting variable power supply 18. This adjustment will account for variations in lengths and compositions of the different cables that may be tested.

The end of probe 24 is then positioned to be in close proximity, and preferably not touching, test cable output end 12b. This spacing is desirable to avoid scratching the finely polished faces of the cable fibers and calibration rod. By means of microscope 32, probe 24 is centered only within a selected fiber core area and a reading obtained. As some small variability in transmission will be obtained on an individual fiber-to-fiber basis due to fiber manufacturing tolerances, it is desirable to repeat the test on a number of different fibers, i.e. 10 in number, for their relative light intensity and to obtain an average fiber light intensity to be used for subsequent area comparison.

In the next step, the operator moves probe 24 to be in close proximity to calibration rod 14 output end 14b, and by means of variable filters 22, the light intensity from rod end 14b is reduced to where it matches the average fiber light intensity obtained from the previous step i.e. the average fiber core intensity. In this manner, the method establishes the equality of transmission characteristics between a representative cross-sectional area of test cable 12 (regardless of its length) and a corresponding cross-section area of calibration rod 14. The size of the common representative area is of course determined by the area of the probe.

It should be noted that the light intensity obtained by the probe is not greatly affected by small variations in its spacing from the faces of the fiber cores and the face of the rod. It is believed that a constant, reproductible light intensity can be obtained from a 10 mil variation in spacing and 25% variation in off-center probe alignment.

The next step in the novel method is to account for difference in diameters (or areas) of test cable 12 and calibration rod 14. This is accomplished by moving probe 24 and microscope 32 to one side and allowing the total amount of light passing through calibration rod 14 to reach the detector.

The total light energy transmitted through the calibration rod is then further varied by adjusting filters 22 according to the ratio of the area of the bundle to the area of the calibration rod, which values are known or can be readily measured. The same ratio can be obtained by using the squares of the diameters. The purpose of this step is to adjust for the differences in diameters (or areas) between the cable and the rod, that is, the total light energy being transmitted through the calibration is changed so that the integrated light output of the cable will be the same as the light energy output from a solid rod of the same diamter of the fiber bundle.

With filters 22 so adjusted, the modified light transmitted through the calibration rod is fed to the detector. This level of light is set into meter 30 by sensity control 28 so that packing fraction scale 34 reads the maximum i.e., 1.0.

The final step is to measure the total amount of light being transmitted through sample cable 12 to the detector. The reduced photometric reading now indicated on scale 34 will be a direct reading of the packing fraction of test cable terminal 12b and must be less than 1.0.

To determine the packing fraction of the other cable terminal 12a, the above described procedure is duplicated with the equipment repositioned so that the probe is directed against terminal 12a which becomes the output terminal and terminal 12b now becomes the input terminal.

In summary, the present method and apparatus provides a simple and effective way of measuring the packing fraction of a terminated fiber optic cable independently of its length. The apparatus being simple and of lightweight, is portable for carrying to the installation site i.e. an aircraft, and the test cable measured in its installed condition.

Obviously many modifications and variations of the present invention are possible in the light of the above teachings. It is therefore to be understood that within the scope of the appended claims the invention may be practiced otherwise than as specifically described.

What is claimed is:

1. A photometric method for measuring the packing fraction of a length of fiber optic cable having a known bundle diameter comprising the step of;
   varying a light intensity transmitted through a calibration rod of known diameter to simulate the physical characteristics of the fiber optic cable; and
   comparing the light intensity transmitted through the fiber optic cable to the light intensity transmitted through the calibration rod, whereby the packing fraction of the fiber optic cable can be determined.

2. A method for measuring the packing fraction of a length of fiber optic cable having a known bundle diameter comprising the steps of;
   transmitting a common source of light through both said fiber optic cable and a calibration rod of known diameter;
   changing the intensity of light passing through the calibration rod so that both the fiber optic cable and the calibration rod appear to have the same light transmitting characteristics and the same physical cross-sectional areas;
   whereby the light intensity being transmitted through the fiber optic cable can be compared with the light intensity passing through the calibration rod to determine the packing fractions of the former.

3. The method of claim 2 whereby the step of varying the transmitted light intensity in the calibration rod is accomplished by varying the intensity of light entering the calibration rod.

4. A photometric method for measuring the packing fraction of a length of fiber optic bundle cable having a known bundle diameter comprising the steps of;
   passing an equal source of light through the sample cable and through a calibration rod of known diameter approximately the diameter of the sample cable;
   comparing the light intensity transmitted through an average fiber core area of said sample cable with the light intensity level transmitted through a comparible area segment of the calibration rod;
   reducing the light intensity passing through the calibration rod to be equal to the light intensity passing through the average cable fiber of the sample so that both the cable and the rod appear to have the same light transmission characteristics;
   further varying the light intensity level passing through the calibration rod by the ratio of the area of the bundle to the area of the calibration rod, so that both appear to have the same area; and
   comparing the light intensity passing through the calibration rod having a 100% packing fraction with the reduced light intensity passing through the sample bundle to determine the packing fraction of the sample cable bundle.

5. The method of claim 4 wherein the step of reducing the light intensity is accomplished by filtering the source of light.

6. Photometric apparatus for measuring the packing fraction of a terminated length of fiber optic cable having a known bundle diameter comprising:
   a given length of solid glass core calibration rod of known diameter adapted positioned in close longitudinal proximity to said fiber optic cable;
   means for transmitting a light source through one end of each of said fiber optic cable and said calibration rod;
   means for detecting the light being transmitted through both said fiber optic cable and calibration rod;
   and means for changing the intensity of light being transmitted through said calibration rod so that the calibration rod and fiber optic cable appear to have the same light transmitting characteristics and the same physical cross-sectional areas.

7. The apparatus of claim 6 wherein probe means are provided for measuring the light intensity passing through a given cross-sectional area smaller than the fiber core and the same cross-sectional area on the calibration rod.

8. The apparatus of claim 7 wherein is included a means for varying the intensity of said light source.

9. The apparatus of claim 8 wherein a series of optical filters are available, one of which is to be inserted between said light source and the light receiving end of said calibration rod.

* * * * *